United States Patent
Kurosawa et al.

[11] Patent Number: 6,027,626
[45] Date of Patent: Feb. 22, 2000

[54] MAGNET AND A MOTOR COMPONENT HAVING A COATING WITH ANTICORROSION AND INSULATION

[75] Inventors: Manabu Kurosawa, Nakatsugawa; Takeshi Anpo, Kasugai; Tatsumasa Yamada, Nagoya, all of Japan

[73] Assignee: Daido Tokushuko, Kaisha, Japan

[21] Appl. No.: 09/081,317

[22] Filed: May 19, 1998

Related U.S. Application Data

[62] Division of application No. 08/514,562, Aug. 14, 1995, abandoned.

[30] Foreign Application Priority Data

Aug. 17, 1994 [JP] Japan .................................. 6-216518
Jan. 26, 1995 [JP] Japan .................................. 7-31693
Jul. 28, 1995 [JP] Japan .................................. 7-193225

[51] Int. Cl.$^7$ .................................................. C25D 13/06
[52] U.S. Cl. .......................................... 204/501; 204/507
[58] Field of Search .................................. 204/500, 501, 204/507, 509

[56] References Cited

U.S. PATENT DOCUMENTS 5,451,306  9/1995  Nakamura et al. ..................... 204/503
5,658,660  8/1997  Teshima et al. ........................ 428/334

*Primary Examiner*—Kishor Mayekar
*Attorney, Agent, or Firm*—Davis and Bujold

[57] ABSTRACT

A motor component covered with a novel electrocoating that fails to detrimentally affects magnetic memory medium provided in a hard disc or other is provided. With enhanced edge covering ratio, an improved insulation coating is easily formed on the motor component. An insulation coating is electrodeposited on an Nd—Fe—B system plastic magnet, a stacked core of silicon steel, a die-cast motor base of aluminum or other motor component through cationic electrodeposition. The electrodeposition paint for use includes 12 ppm or less of tin content in the aqueous solution, 0.5% or less by weight of carbon black content in the aqueous solution, and, instead, has titanium dioxide and/or silicon dioxide added to pigment. The electrodeposited insulation coating, which has a specified thickness, is heated to temperatures ranging between 40° C. and 90° C. After such preliminary curing, temperatures are again heated to between 150° C. and 190° C. In the hard disc drive unit assembled of such electrodeposited components, no tin is scattered therefrom, thereby protecting memory content from collapsing, and providing enhanced anticorrosion and insulation.

13 Claims, 8 Drawing Sheets

F I G. 1
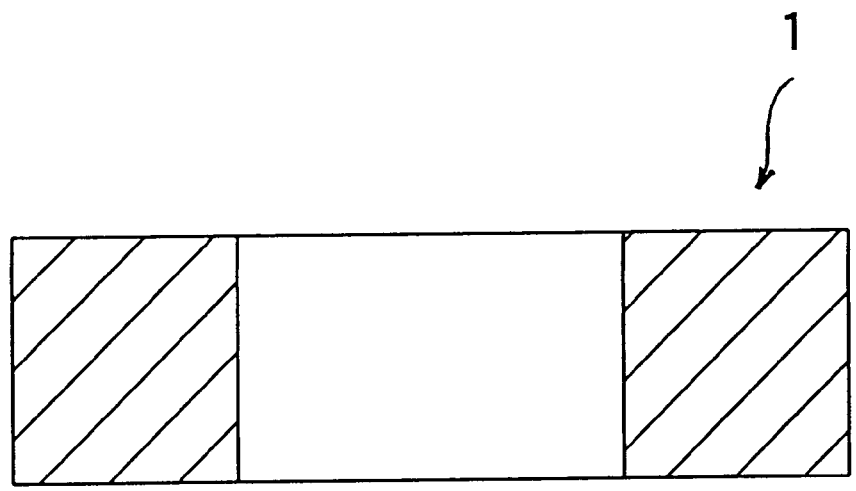

F I G. 3
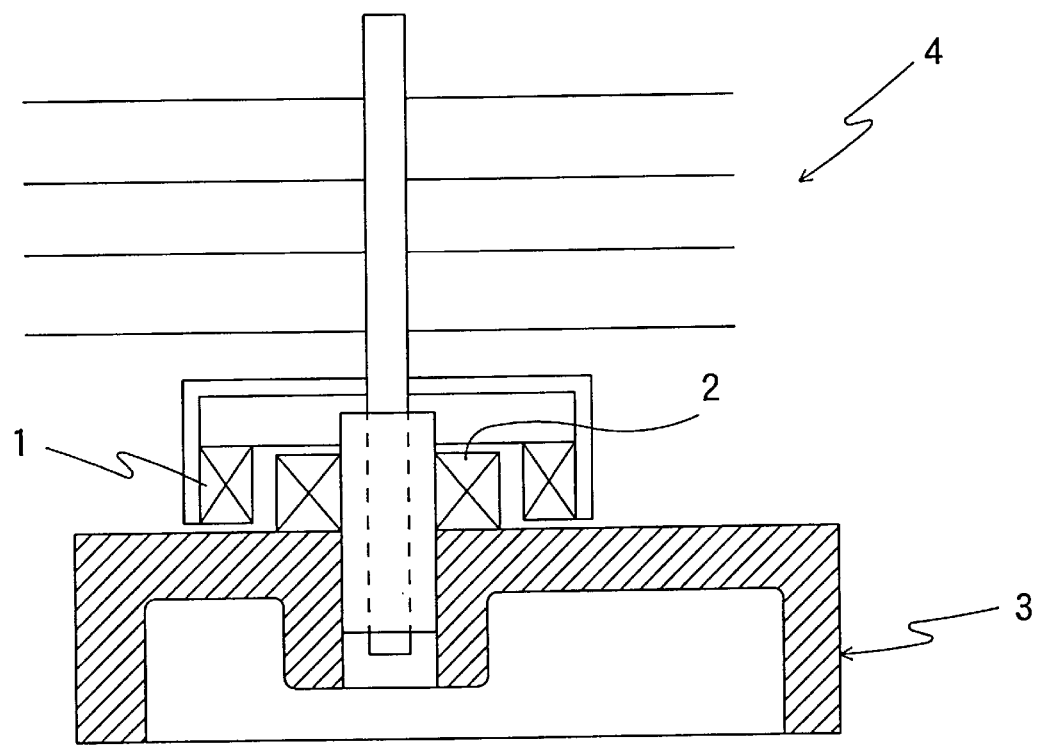

F I G. 6
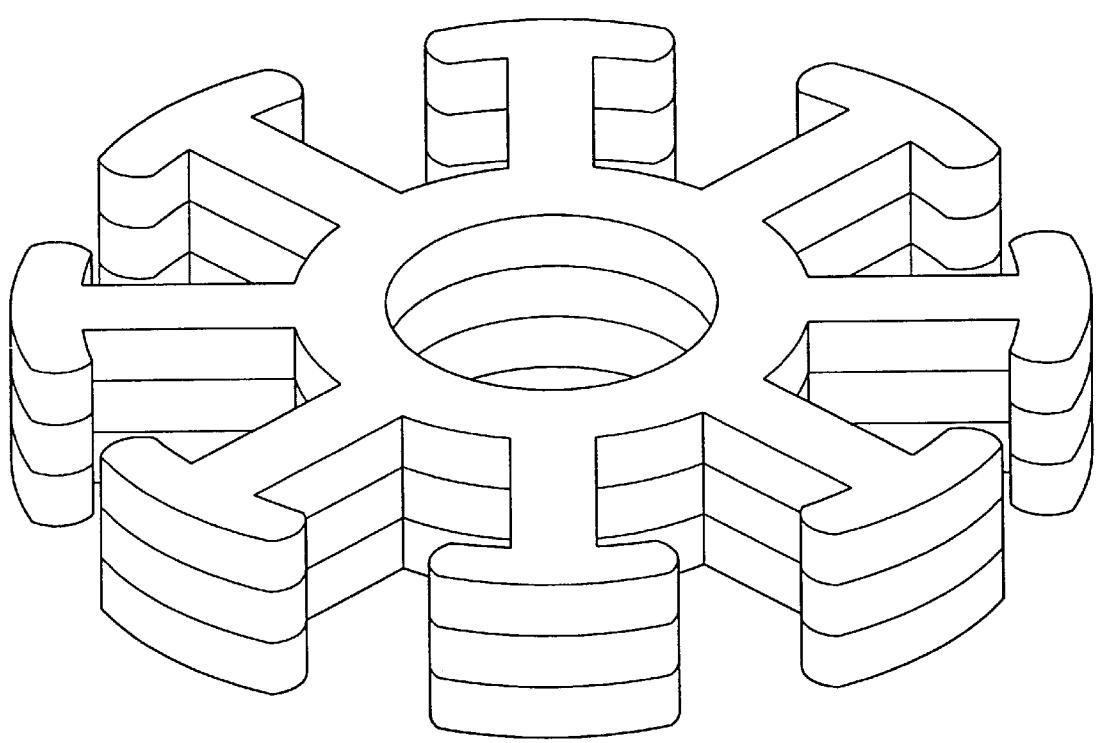

MAGNET AND A MOTOR COMPONENT HAVING A COATING WITH ANTICORROSION AND INSULATION

This is a Divisional Application of U.S. Ser. No. 08/514,562 filed Aug. 14, 1995, now abandoned.

FIELD OF THE INVENTION

This invention relates to a magnet, a stacked core, a motor base or other motor component having excellent in anticorrosion and insulation properties, and particularly to a magnet, a stacked core or a motor base which is covered by an electrocoating, thereby providing superior anticorrosion and insulation.

BACKGROUND OF THE INVENTION

Conventionally, a stepping motor stacked core or other motor component is electrodeposited, thereby assuring good anticorrosion and insulation.

For example, Japanese laid-open patent application No. 58-83559 proposes a method of insulating a stacked core of coil block for use in a stepping motor of a clock. In the method, by immersing the stacked core in aqueous epoxy solution containing amine, a cationic electrocoating of epoxy is formed on the stacked core, which is made a cathode for this purpose. Subsequently, the electrocoating is heat treated at temperatures ranging between 100° C. and 300° C. and is formed into an epoxy coating through condensation.

However, in the prior-art electrodeposited motor component, as shown in FIG. 7, when the thickness of the coating on the surface of the component is T, the thickness t of the coating on the edge of the component tends to be smaller than thickness T. The physical quantity defined as t/T is an edge covering ratio. A lowered edge covering ratio causes imperfect insulation. To raise the edge covering ratio, the curing temperature after the electrodeposition needs to be lowered, for example:

Conventionally, to lower the curing temperature, tin compound, for example, the compound of isobutyl tin oxide is generally added by about 0.05% by weight to the aqueous solution of electrodeposition paint, i.e., by about 0.2% by weight to the coating.

It was, however, reported that when the motor assembly of the stacked core, the magnet and the like with the insulation coating formed thereon in the aforementioned conventional manner was used in a hard disc drive unit, the content of memory in the hard disc collapsed. We reviewed this problem and concluded that the problem was caused by the content of the coating.

SUMMARY OF THE INVENTION

Wherefore, the object of the invention is to provide a motor component covered with a novel electrocoating, failing to detrimentally affect a magnetic memory medium, to raise the edge covering ratio and to easily form a coating with improved insulation on the motor component.

Our research has and found that by applying an electrocoating to the motor component using an electrodeposition paint containing 12 ppm or less of tin and tin compound in the aqueous solution, the memory content can be protected from collapse.

After consideration, we concluded that the reported memory collapse resulted from the tin and tin compound being released from the insulation coating and sticking to the surface of the magnetic memory medium. We succeeded in solving the problem by eliminating such cause. For this purpose, an electrocoating is formed containing only 50 ppm or less of tin and tin compound. Therefore, in present the invention no further tin content is added as in the prior art.

In the electrodeposition paint of the present invention, carbon black is added to the aqueous solution only by 0.5% by weight or less, and titanium dioxide and/or silicon dioxide is added to the pigment. The pigment thus preferably contains a reduced quantity of carbon black, because the excessive content of carbon black would impair insulation, as further described below.

The aqueous paint solution for use in electrodeposition painting generally contains water and paint in the rate of 3 to 1 or 4 to 1. Upon curing the tin content and the quantity of carbon black in the coating through heat curing, the final tin and tin compound in the electrocoating on the motor component can be 50 ppm or less. The quantity of carbon black in the electrocoating can be 2% by weight or less.

Specifically, the electrodeposition paint for use can include the pigment content of 22% to 40% by weight of total solidified content, i.e., the content of pigment and resin. When using the paint containing the pigment content including titanium dioxide or silicon dioxide in such range, the edge covering ratio as well as the hardness of the insulation coating are enhanced.

The motor component, other than the magnet, the invention relates to is, for example, a stacked core composed of 1% to 3% by weight of silicon and remaining percentage by weight of iron, of low carbon steel, or of pure iron, or a motor base composed of aluminum alloy. For use, such motor component is tightly wound with coil or is exposed to the outside, thereby requiring a thick and hard coating. By using the paint containing the pigment in the aforementioned range, the edge covering ratio and hardness of the insulation coating can be increased.

On the magnet or permanent magnet, the electrocoating is formed preferably using an electrodeposition paint including a pigment content of 16% to 28% by weight of total solidified content. For use, the magnet is wound with no coil and fails to be exposed outside. Therefore, the magnet is different in conditions from the stacked core or the motor base. Recently, motors were made compact, thereby reducing the space inside the motors. The insulation coatings covering the magnet need not to be too thick. The body of the magnet referred to herein can consist of an Nd—Fe—B system plastic magnet, a hot compression molded magnet or a sintered magnet.

When painting the motor component of the invention, first the electrodeposition paint having the tin and tin compound restricted to 12 ppm or less in the aqueous solution is electrodeposited to the motor component. Subsequently, during preliminary heat treating the coating is heated to temperatures ranging between 40° C. and 90° C., and during second-step curing the coating is heated to temperatures ranging between 150° C. and 190° C. The method of painting the motor component is characterized by such two-step curing.

The two-step curing enhances the edge covering ratio. Furthermore, pinholes made in the positions contacted by electrode pins for use in electrodeposition painting can be filled. According to the method of the invention, memory content is prevented from collapsing. Furthermore, the coating is made uniformly thick on the motor component, and good anticorrosion and insulation are assured.

In the painting method, the electrodeposition paint for use contains only 0.5% by weight or less of micro carbon black in relation to the aqueous solution. Instead of carbon black, titanium dioxide and/or silicon dioxide having a relatively large diameter is added to the pigment.

For electrodeposition painting the stacked core composed of 1% to 3% by weight of silicon and the remaining percentage by weight of iron, of low carbon steel, or of pure iron or for electrodeposition painting the motor base composed of aluminum alloy, the electrodeposition paint for use preferably contains 22% to 40% by weight of pigment in the solidified content. For electrodeposition painting the Nd—Fe—B system plastic magnet, the hot compression molded magnet or the sintered magnet, the electrodeposition paint for use preferably contains 16% to 28% by weight of pigment in the solidified content.

The first-step, preliminary heat treating is very important for eliminating pinholes or other made by later-mentioned hold projections in contact with the surface of the motor component or by gas discharged from the component being cured. The heat treating time period is selected such that the coating is fluid enough to fill the pinholes or other. The setting of heat treating time period varies with the preliminary heat treating temperature. When the preliminary heat treating temperatures range between 40° C. and 90° C., the time period can be five minutes at minimum, thereby providing considerable heat treating effectiveness. The lower heat treating temperatures especially provide more heat treating effectiveness.

For the second-step curing, the time period is selected to be long enough for the coating to be burnt and set, and also varies with curing temperatures. For example, at the temperatures ranging between 150° C. and 190° C., the time period is five minutes at minimum.

The preliminary heat treating can be carried out while the temperature is raised at the rate of 20° C. per minute or lower. The preliminary heat treating gives sufficient fluidity to the coating such that pinholes or other defective portions are covered by the coating. As far as the purpose is attained, the coating can be retained to cure in the appropriate temperature range for some period of time. The temperature does not have to be kept constant, and can be raised within the appropriate range during the preliminary heat treating. However, if the temperature is raised excessively fast, the period of time for the preliminary heat treating would be shortened, thereby resulting in imperfect covering of pinholes and other imperfections.

In the invention the cationic electrodeposition painting is preferable.

The insulation coating on the motor component of the invention contains only minor tin content. Therefore, the tin and tin compound is prevented from scattering, and the motor component, even if used in the hard disc drive unit, fails to cause a collapse of memory.

The content of carbon black in the electrodeposition paint is decreased while the content of titanium dioxide and/or silicon dioxide is increased. Therefore, although the tin content is controlled to a minimum, optimum edge covering ratio can be assured. Especially, through two-step curing, the coating is made uniformly thick. Even the thickness of the coating formed on the edge of the motor component can be the same as that of the coating formed on the other surfaces of the component. The pinholes made in the surface of the coating can be concealed by the coating.

Consequently, the insulation coating formed according to the invention can have a uniform thickness all over its surface and can provide enhanced insulation and anti corrosion.

BRIEF DESCRIPTION OF THE DRAWINGS

The invention will now be described, by way of example, with reference to the drawings, in which:

FIG. 1 is a side view of a plastic magnet of an embodiment in the invention;

FIG. 3 is a schematic cross-sectional view of a hard disc drive unit composed of a magnet, a stacked core and a motor base in the embodiment of the invention;

FIG. 6 is a perspective view of another electronic component provided by the invention;

DETAILED DESCRIPTION OF THE PREFERRED EMBODIMENT

Embodiments of the invention are now detailed referring to the accompanying drawing figures. However, the invention is not restricted to the embodiments.

Figure 2A:
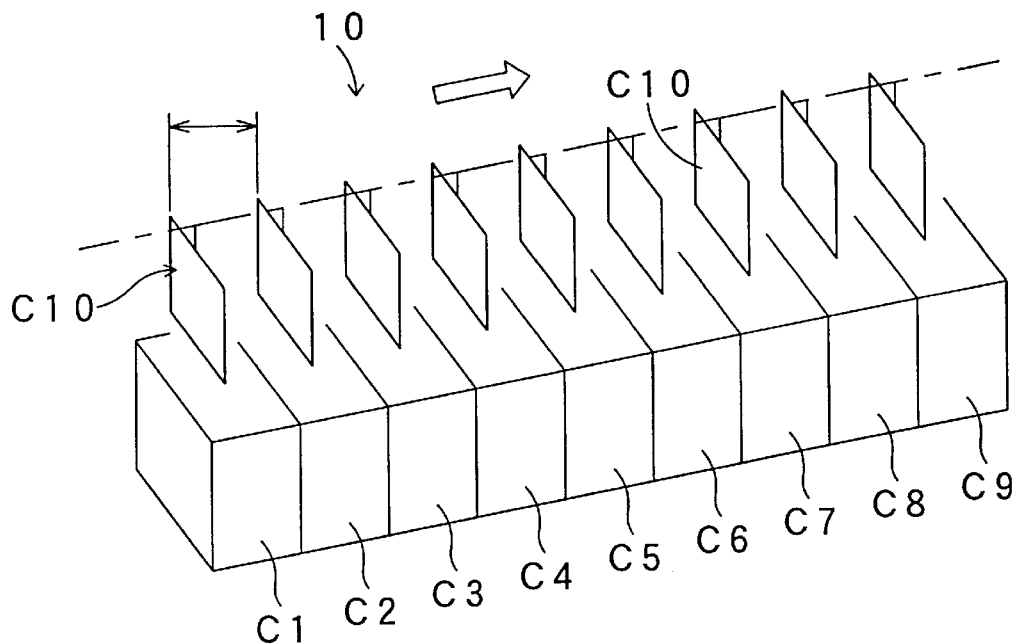
FIGS. 2A and 2B are schematic representations of an electrodeposition painting device for use in the invention.
Figure 2B:
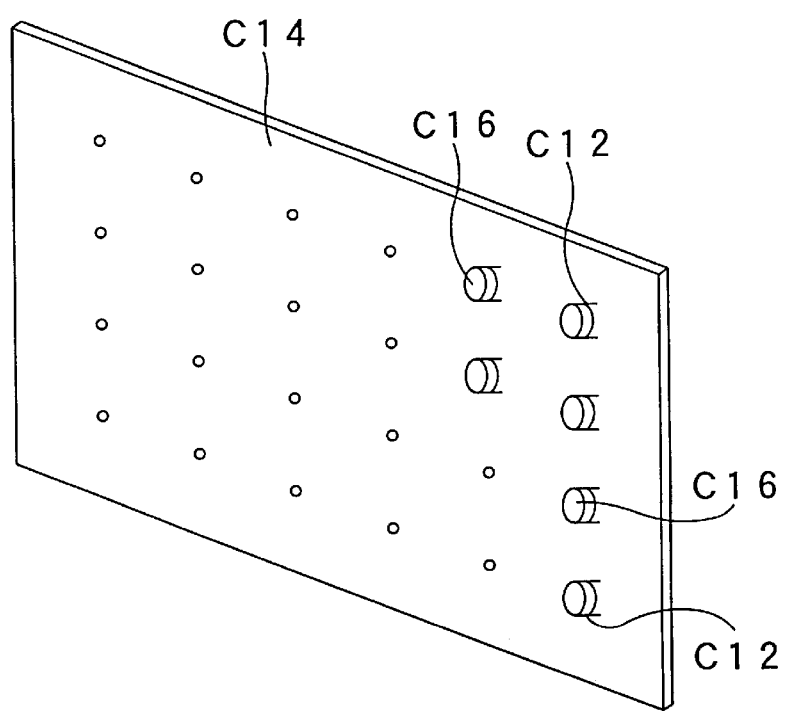

FIG. 1 shows an annular Nd—Fe—B system plastic magnet 1 for use in a rotary part of a small-sized motor, and FIGS. 2A, 2B diagrammatically show an electrodeposition painting device for electrodeposition painting the plastic magnet 1.

The electrodeposition painting device 10, as shown in FIG. 2A, is provided along a specified delivery path with a rinsing bath C1, a drip bath C2, a first electrodeposition bath C3, a first filtrate bath C4, a second electrodeposition bath C5, a second filtrate bath C6, a third filtrate bath C7, a drip bath C8 and a rinsing bath C9. Pure water is contained in the rinsing baths C1, C9, the aqueous electrodeposition paint solution is contained in the electrodeposition baths C3, C5, and specified filtrate is contained in the filtrate baths C4, C6 and C7. Work holders C10 are sequentially immersed in these treatment liquid, delivered along the path and then baked by a not-shown baking furnace. The dimension of these baths C1–C9 is adapted to the dimension of the work holders C10. The work holders C10 are delivered intermittently corresponding to each distance between the baths such that each work holder is inserted in each of the baths C1–C9 at the same time. Also the holders C10 are repeatedly lowered, stopped and lifted up such that they are immersed or retained for necessary period of time in respective treatment baths C1–C9. The immersing or retention time is predetermined such that the coating having a predetermined thickness is formed on the surface of each of works C16 held by the work holders C10. In the electrodeposition baths C3, C5, the aqueous electrodeposition paint solution is stirred such that the concentration thereof can be made constant.

The work holders C10 are, as shown in FIG. 2B, provided for holding a multiplicity of works C16 with a multiplicity of pointed hold projections C12 consisting of leaf spring or other material arranged on a hold plate C14. Each work C16 is held or contacted by three hold projections C12.

Figure 8:
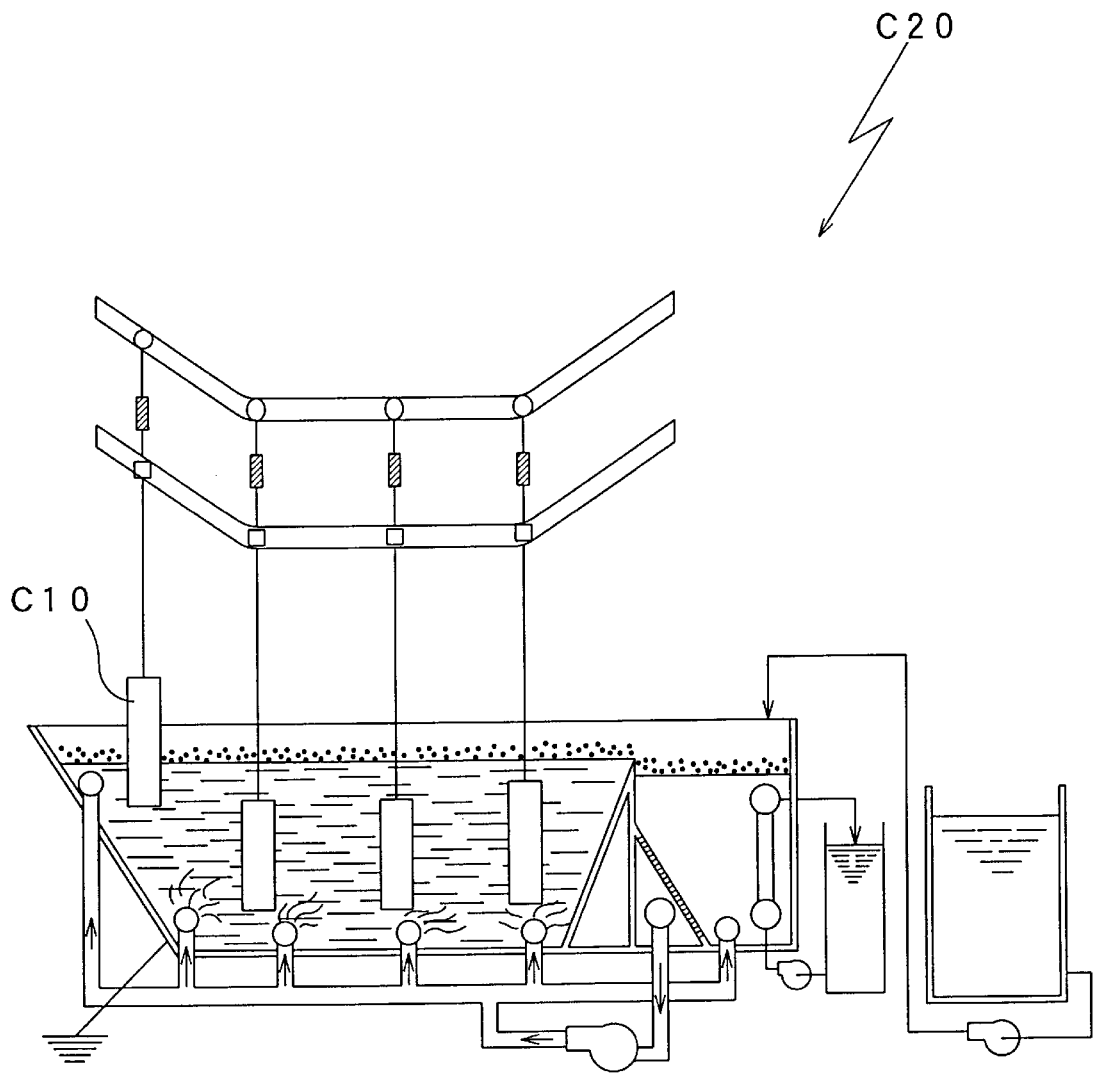
FIG. 8 is a schematic representation of a modified electrodeposition painting device for use in the embodiment.

As shown in FIG. 2A, the work holders C10 are intermittently delivered from bath to bath. As shown in FIG. 8, however, the work holders C10 can be continuously immersed in a large-sized electrodeposition bath C20 for a specified period of time.

The aqueous paint solution for use in the electrodeposition painting contains water, solvent and solidified paint content in the respective percentages of 72, 3 and 25. In the same manner as in the conventional electrodeposition paint, the solidified paint content is composed of 75% by weight of resin content and the remaining percentage by weight of pigment content. The contained solvent is known for facilitating mixing of water with the solidified paint content. The electrodeposition paint for use in the embodiment is characterized in the following two points.

① The pigment content contains a reduced quantity of carbon black and, instead, is supplemented with titanium dioxide and/or silicon dioxide, imparting a color of white or gray. The carbon black contained in the aqueous paint solution at 0.5% or less by weight.

② Different from the conventional aqueous paint solution, no tin or tin compound is added. The aqueous solution of the invention contains little, for example, 12 ppm or less of tin or tin compound.

The resin of the solidified paint is mainly composed of epoxy resin, in the same manner as the conventional electrodeposition paint.

The aforementioned characteristic feature ② can be easily confirmed by analyzing the electrodeposition paint through atomic absorption spectro photometry and emission spectral analysis.

The cationic electrodeposition painting is preferable because metal is prevented from eluting from electrodeposited objects.

The invention is further detailed in the following embodiment together with reference examples.

FIRST EMBODIMENT

The aqueous solution of electrodeposition paint containing the pigment content of 22% by weight in relation to the solidified paint content was applied in the electrodeposition painting device 10 shown in FIG. 2 to an annular Nd—Fe—B system plastic magnet having an outer diameter of 22.0 mm, an inner diameter of 20.0 mm and a length of 10.0 mm under the following conditions, to form 25 μm thick coating. The resulting edge covering ratio was 45%.

Electrodeposition Painting Conditions
① Voltage: 200V to 300V
② Electrodeposition Temperature: 28° C.
③ Curing (Baking) Process: two-step curing First step: 80° C.×15 minutes Second step: 160° C.×20 minutes During the first heat treating, a furnace was heated to 80° C. in advance and the electrodeposited magnet was inserted and retained in the heated furnace. The second curing was done in the same manner as in the first curing, except that the furnace was heated to 160° C. in advance.

First Reference Example

For comparison, the annular Nd—Fe—B system plastic magnet identical to the magnet in the embodiment was electrodeposited in the painting device 10 shown in FIG. 2, using the electrodeposition paint under the following conditions, thereby forming a 23 μm thick coating on the magnet. The paint is almost identical to the paint for use in the embodiment. However, for the purpose of comparison with the embodiment, about 0.05% by weight of tin and tin compound is added to the aqueous solution. The resulting edge covering ratio was 30%.

Electrodeposition Painting Conditions
① Voltage: 250V
② Electrodeposition Temperature: 28° C.
③ Curing (Baking) Temperature: 200° C.
④ Curing Time Period: 20 minutes Second Reference Example For reference, the annular Nd—Fe—B system plastic magnet identical to the magnet of the embodiment was electrodeposited in the painting device 10 shown in FIG. 2 using an electrodeposition paint under the following conditions, thereby forming a 20 μm coating on the magnet. Different from the embodiment, the paint contains 10% by weight or more of carbon black in relation to the pigment content (0.5% by weight or more of carbon black in relation to the aqueous paint solution), imparting color of black. In the same manner as the embodiment, however, the paint contains 12 ppm or less of tin and tin compound in relation to the aqueous solution. The resulting edge covering ratio was 10%.

Electrodeposition Painting Conditions
① Voltage: 250V
② Electrodeposition Temperature: 28° C.
③ Curing (Baking) Temperature: 210° C.
④ Curing Time Period: 20 minutes It is seen that the embodiment provides an increased edge covering ratio as compared with the first and second reference examples.

Subsequently, the plastic magnets of the embodiment and the first and second reference examples were tested for anticorrosion and insulation.

(1) Anticorrosion Test

The magnets were retained in a humidity cabinet tester at 80° C. in the atmosphere of relative humidity 95% for 96 hours to 500 hours. Results are shown in Table 1.

TABLE 1

|  | ANTICORROSION | | | |
| --- | --- | --- | --- | --- |
| RETENTION TIME | 96 | 200 | 300 | 500 |
| EMBODIMENT | ○ | ○ | ○ | ○ |
| REFERENCE EXAMPLE1 | ○ | ○ | ○ | Δ |
| REFERENCE EXAMPLE2 | ○ | ○ | x | x |

In Table 1,
○ denotes that no rust arises;
Δ denotes that the edge of a test piece gathers minute pointed rust that can be found on a 30 times microscope; and
x denotes that the edge of the test piece gathers visible pointed rust.

Subsequently, the test piece of the embodiment was prepared by gradually raising temperatures from room temperature to 100° C. during first-step preliminary curing. Table 2 shows how the anticorrosion of test pieces is varied when the rate of raising temperatures from 30° C. to 100° C. is kept constant. The conditions of the second heat treating were the same as in the first embodiment.

TABLE 2

| HEATING RATE BETWEEN 30° C. AND 100° C. | ANTICORROSION HUMIDITY CABINET TEST: 80° C. × 95%, 500 HOURS |
| --- | --- |
| 10° C./MINUTE | ○ |
| 20° C./MINUTE | ○ |
| 30° C./MINUTE | Δ |
| 40° C./MINUTE | x |

In Table 2,
○ denotes that no rust arises;
Δ denotes that the edge of a test piece gathers minute pointed rust that can be found on a 30 times microscope; and
x denotes that the edge of the test piece gathers visible pointed rust.

It is seen from Table 2 that even if the furnace is heated slowly at the rate of 20° C. per minute, excellent anticorrosion is provided. In this case, the period of time during which temperatures are in the range between 40° C. and 80° C. is regarded as important. The difference between temperatures before and after the raising of temperature is not so important. Therefore, there can be a difference of about 10° C.

(2) Insulation Test

The magnets of the embodiment and of the first and second reference examples were tested using a withstand voltage meter for withstand voltage with alternating electric power source. Results are shown in Table 3.

TABLE 3

| TEST VOLTAGE (V) | 100 | 200 | 500 |
|---|---|---|---|
| EMBODIMENT | ○ | ○ | ○ |
| REFERENCE EXAMPLE 1 | ○ | ○ | Δ |
| REFERENCE EXAMPLE 2 | ○ | Δ | x |

In Table 3
○ denotes that no test piece can have electric continuity therethrough;
Δ denotes that one test piece among ten can have electric continuity therethrough; and
x denotes that one test piece among two can have electric continuity therethrough.

As seen in Table 3, the coating for the plastic magnet of the embodiment is superior in anticorrosion and insulation to the coating for magnets of the first and second reference examples.

The Nd—Fe—B system plastic magnet identical to the magnet of the embodiment was tested to see how the anticorrosion and edge covering ratio are varied when the burnt residue or ash content equivalent to the pigment included in the solidified content is changed. Results are shown in Table 4. In the test the desired thickness of coating was 25 μm. The anticorrosion test was conducted at temperature of 80° C., relative humidity of 95% and retention time period of 200 hours. The other test conditions were the same as in the aforementioned first embodiment if the tin content in the aqueous solution is 12 ppm or less. During curing, temperatures were kept constant in the same way as in the first embodiment.

TABLE 4

| ASH CONTENT (% BY WEIGHT) | ANTICORROSION | EDGE COVERING RATIO (%) |
|---|---|---|
| 10 | Δ | 10 |
| 16 | ○ | 35 |
| 22 | ○ | 45 |
| 28 | ○ | 50 |
| 34 | Δ | 55 |

NOTE: THE ASH CONTENT IS REPRESENTED IN PERCENTAGE BY WEIGHT IN RELATION TO 100% BY WEIGHT OF SOLIDIFIED CONTENT.
In Table 4,
○ denotes that anticorrosion is excellent; and
Δ denotes that test pieces gather pointed rust to some degree.

As seen in Table 4, the ash content of Nd—Fe—B system plastic magnet is preferably between 16% and 28% by weight of the solidified content. When the ash content is outside this preferable range, the anticorrosion is deteriorated.

From additional test it is found out that two-step curing is superior to curing only at high temperatures. The paint coating with no pinholes made therein can be obtained through the two-step heat treating: during the preliminary curing the furnace is heated to between 40° C. and 90° C., preferably between 60° C. and 80° C. for appropriate period of time between 5 minutes and 180 minutes, preferably between 10 minutes and 60 minutes and during the second-step curing the electrocoating is cured for 5 to 180 minutes, preferably for 10 to 60 minutes. If second-step curing temperatures are below 150° C. during the second-step curing, the electrocoating is insufficiently cured and outgasses, and cannot bear during practical use. If the temperatures exceed 190° C. alloy powder is oxidized, the magnetic properties are deteriorated and the magnet is largely deformed. Therefore, the second-step curing temperatures preferably ranges between 150° C. and 190° C.

Figure 4:
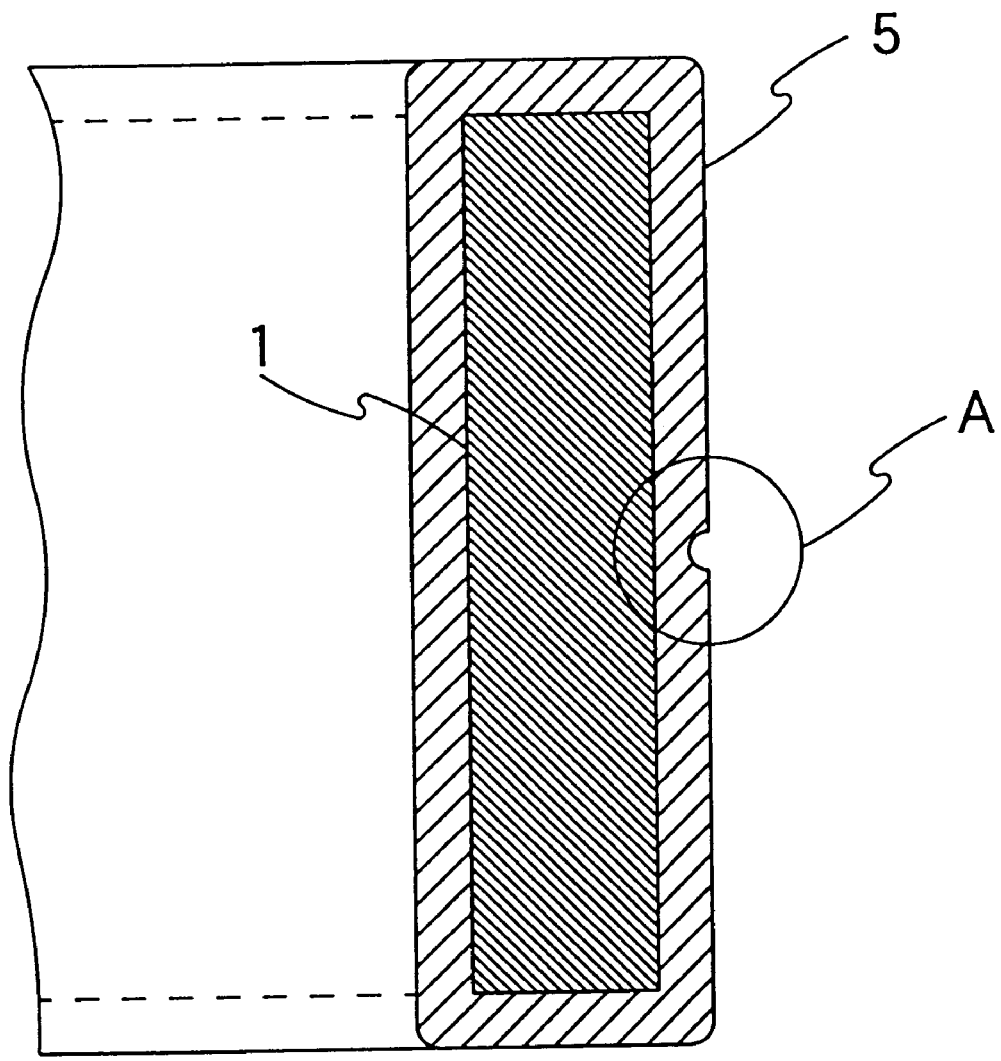
FIG. 4 is a cross-sectional view of the magnet shown in FIG. 3.
Figure 5:
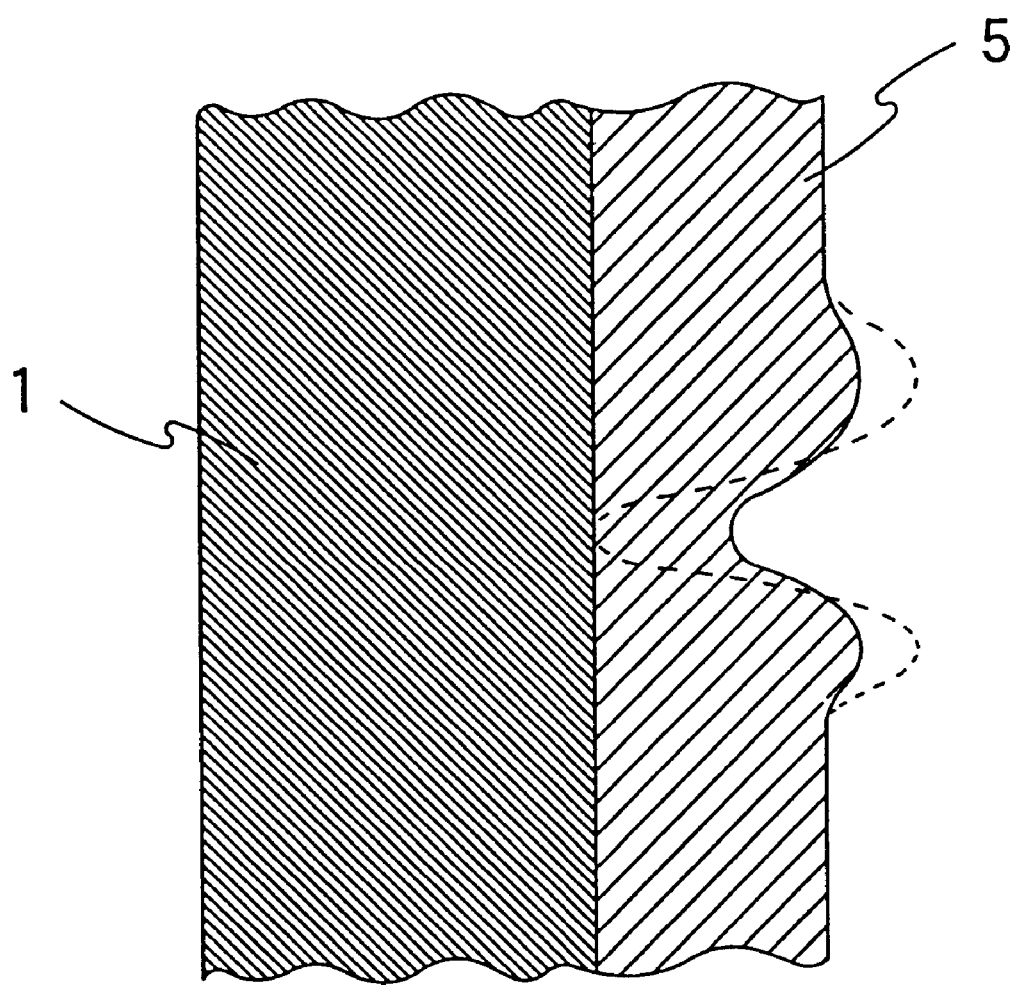
FIG. 5 is a detailed view of section A of FIG. 4.
Figure 7:
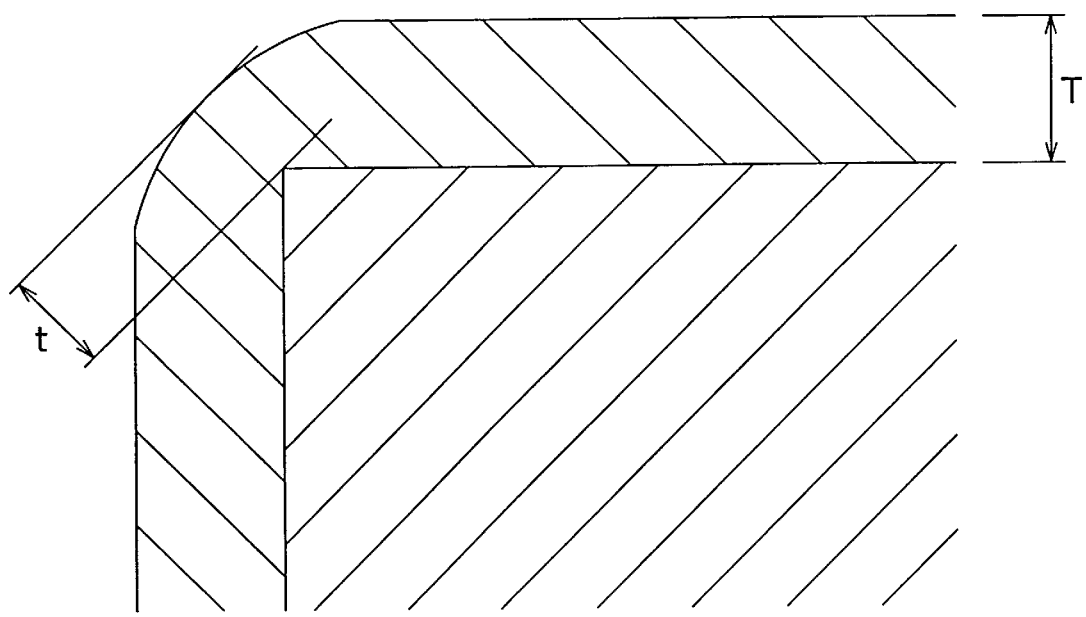
FIG. 7 is an explanatory view of edge covering ratio.

Since the preliminary heat treating precedes the second-step curing, uncovered portions or pinholes made by the electrode pins or the hold projections C12 having contacted the surface of the magnet are filled, thereby preventing the surface of the magnet from being exposed outside. Especially, in FIG. 5, a solid line shows an insulation coating 5 formed on the plastic magnet 1 through two-step curing, and a dotted line shows the insulation coating formed through only one step curing at high temperatures. As shown in FIGS. 4 and 5, pinholes are concealed through the two-step curing, thereby enhancing the insulation and anti-corrosion.

For the object to be electrodeposited, by replacing the magnet of the embodiment by a stacked core for use in a small-sized motor composed of 1 to 3% by weight of silicon and the remaining percentage by weight of iron, the aforementioned test was conducted. Results are shown in Table 5. The desired thickness of the electrocoating on the stacked core was 50 μ. The anticorrosion test was carried out at temperature of 80° C. and relative humidity of 95% for retention time period of 200 hours. The other test conditions were the same as in the first embodiment. The electrocoating was cured through two-step curing.

TABLE 5

| ASH CONTENT (% BY WEIGHT) | ANTICORROSION | INSULATION WITHSTAND VOLTAGE(V) | EDGE COVERING RATIO (%) |
|---|---|---|---|
| 10 | Δ | 200 | 10 |
| 16 | ○ | 300 | 30 |
| 22 | ○ | 500 | 45 |
| 28 | ○ | 1000 | 50 |
| 34 | ○ | 1500 | 50 |
| 40 | ○ | 2000 | 50 |
| 50 | Δ | 2300 | 50 |

NOTE: THE ASH CONTENT IS REPRESENTED IN PERCENTAGE BY WEIGHT IN RELATION TO 100% BY WEIGHT OF SOLIDIFIED CONTENT.
In Table 5,
○ denotes that anticorrosion is excellent; and
Δ denotes that test pieces gather pointed rust to some degree.

As seen in Table 5, although the electrocoating on the stacked core contains more ash content relative to solidified paint content than that on the magnet, excellent properties are provided. Specifically, the ash content preferably ranges between 22% and 40% by weight. Additional test shows that superior electrocoating can be obtained through two-step heat treating: during the first heat treating the electrocoating is cured between 60° C. and 80° C. for 10 to 60 minutes and during the second curing it is cured at high temperatures ranging between 150° C. and 190° C. for 5 to 180 minutes, preferably for 10 to 60 minutes.

Again by replacing the stacked core by a die-cast motor base consisting of aluminum alloy, tests were conducted and the same results as in the stacked core were obtained.

Subsequently, the magnet 1, a stacked core 2 and an aluminum die-cast motor base 3 were electrodeposited using the electrodeposition paint containing little tin content, were cured through the two-step process, and were assembled together into a hard disc drive unit 4 as shown in FIG. 3. As a result of operating the hard disc drive unit 4, no memory content collapsed. Since these components 1, 2 and 3 are provided with improved insulation and anticorrosion, they are durable and can withstand-even long use.

As aforementioned, the invention is not restricted to the aforementioned embodiments. Various modifications and alterations are possible within the scope of the invention. For example, in the embodiment, the annular plastic magnet for use in the rotary part of the motor, the stacked core and the motor base were electrodeposited. Alternatively, a magnetic anisotropic, hot compression molded magnet or a sintered magnet can be electrodeposition painted. For the stacked core, a laminated configuration consisting of steel plates as shown in FIG. 6 can be electrodeposition painted. The stacked core can be composed of silicon steel, low carbon steel or pure iron. The motor components can also be used in parts other than the rotary part of the motor.

As detailed above, the magnet and the motor component like the stacked core and the motor base, provided by the invention, are superior in anticorrosion and insulation. Therefore, by assembling these into electronic equipment, enhanced reliability can be assured. Especially, since the electrocoating contains little tin content, the hard disc or other electronic peripheral equipment is prevented from being adversely affected by too much tin content, thereby assuring long and stable use.

What is claimed is:

1. A method of painting a motor component comprising the steps of:

electrodepositing by cationic electrocoating onto said motor component an electrodeposition paint in an aqueous solution including epoxy resin, and a trace amount of no more than 12 ppm of tin; and curing the electrodeposition paint in a temperature range between 150° C. and 190° C.

2. A method of painting a motor component according to claim 1, further comprising preliminary heat treating of the electrodeposited paint in a temperature range between 40° C. and 90° C. prior to curing.

3. A method of painting a motor component according to claim 2, wherein said electrodeposition paint in an aqueous solution includes a paint pigment having 0.5% or less by weight of carbon black content, and has at least one of titanium dioxide and silicon dioxide added to the pigment.

4. A method of painting a motor component according to claim 3, wherein said motor component is at least one of a stacked core composed of 1 to 3% weight of silicon and remaining percentage by weight of iron, of low carbon steel or of pure iron, and a motor base of aluminum alloy, wherein said electrodeposition paint includes solidified content, and 22% to 40% by weight of pigment is contained in said solidified content.

5. A method of painting a motor component according to claim 4, wherein during said preliminary heat treating temperatures are raised at the rate of 20° C. per minute or at the lower rate.

6. A method of painting a motor component according to claim 3, wherein said motor component is at least one of an Nd—Fe—B system plastic magnet, a hot compression molded magnet and a sintered magnet, electrocoating is formed on said magnet using said electrodeposition paint including solidified content, and 16% to 28% by weight of pigment is contained in said solidified content.

7. A method of painting a motor component according to claim 6, wherein during said preliminary heat treating temperatures are raised at the rate of 20° C. per minute or at the lower rate.

8. A method of painting a motor component according to claim 3, wherein during said preliminary heat treating temperatures are raised at the rate of 20° C. per minute or at the lower rate.

9. A method of painting a motor component according to claim 2, wherein said motor component is at least one of a stacked core composed of 1 to 3% by weight of silicon and remaining percentage by weight of iron, of low carbon steel or of pure iron, and a motor base of aluminum alloy, wherein said electrodeposition paint includes solidified content, and 22% to 40% by weight of pigment is contained in said solidified content.

10. A method of painting a motor component according to claim 9, wherein during said preliminary heat treating temperatures are raised at the rate of 20° C. per minute or at the lower rate.

11. A method of painting a motor component according to claim 2, wherein said motor component is at least one of an Nd—Fe—B system plastic magnet, a hot compression molded magnet and a sintered magnet, electrocoating is formed on said magnet using said electrodeposition paint including solidified content, and 16% to 28% by weight of pigment is contained in said solidified content.

12. A method of painting a motor component according to claim 11, wherein during said preliminary heat treating temperatures are raised at the rate of 20° C. per minute or at the lower rate.

13. A method of painting a motor component according to claim 2, wherein during said preliminary heat treating temperatures are raised at the rate of 20° C. per minute or at the lower rate.

* * * * *